US012218392B2

(12) United States Patent
Zhou et al.

(10) Patent No.: US 12,218,392 B2
(45) Date of Patent: Feb. 4, 2025

(54) METHOD OF PREDICTING LIQUID REGIONS AND VAPOR REGIONS IN BIPOLAR PLATES OF A FUEL CELL

(71) Applicant: Toyota Motor Engineering & Manufacturing North America, Inc, Plano, TX (US)

(72) Inventors: Yuqing Zhou, Ann Arbor, MI (US); Ercan M. Dede, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 279 days.

(21) Appl. No.: 17/088,266

(22) Filed: Nov. 3, 2020

(65) Prior Publication Data

US 2022/0140377 A1    May 5, 2022

(51) Int. Cl.
*H01M 8/2404* (2016.01)
*H01M 8/0258* (2016.01)
*H01M 8/0267* (2016.01)

(52) U.S. Cl.
CPC ....... *H01M 8/2404* (2016.02); *H01M 8/0258* (2013.01); *H01M 8/0267* (2013.01)

(58) Field of Classification Search
CPC ............. H01M 8/0258; H01M 8/0267; H01M 8/04291; H01M 8/04835; H01M 8/04992; H01M 8/2404; Y02E 60/50
See application file for complete search history.

(56) References Cited

U.S. PATENT DOCUMENTS

| 6,924,052 B2 | 8/2005 | Lee | |
|---|---|---|---|
| 2014/0272661 A1* | 9/2014 | Goebel | H01M 8/0254 429/514 |
| 2019/0214658 A1* | 7/2019 | Zhang | H01M 8/0267 |

FOREIGN PATENT DOCUMENTS

| CN | 102299343 A | * 12/2011 |
|---|---|---|
| CN | 104821407 A | * 8/2015 |

(Continued)

OTHER PUBLICATIONS

Holst, Terry L. "Supercomputer applications in computational fluid dynamics." Supercomputing'88: Proceedings of the 1988 ACM/IEEE Conference on Supercomputing, vol. II Science and Applications. IEEE, 1988 (Year: 1988).*

(Continued)

*Primary Examiner* — Matthew T Martin
*Assistant Examiner* — Jared Hansen
(74) *Attorney, Agent, or Firm* — Jordan IP Law, LLC

(57) ABSTRACT

A method of designing a fuel cell includes executing one or more programs on one or more computing devices having one or more processors to predict a location of one or more liquid regions and one or more vapor regions in microchannels at an air layer of a plate of the fuel cell. Based on the prediction, fluid flow networks for the air layer, a hydrogen layer, and a coolant layer of the fuel cell are simultaneously optimized via homogenized flow optimization. In response to the results of the homogenized flow optimization, one or more multi-scale Turing-patterned microstructures are generated for the air layer and the hydrogen layer. One or more multi-scale Turing-patterned microstructures are generated for the coolant layer by stacking the air layer and the hydrogen layer.

13 Claims, 13 Drawing Sheets
(2 of 13 Drawing Sheet(s) Filed in Color)

(56) References Cited

FOREIGN PATENT DOCUMENTS

| CN | 108155400 A | * | 6/2018 | ......... | H01M 8/04029 |
| CN | 109616684 A | * | 4/2019 | ......... | H01M 8/0206 |

OTHER PUBLICATIONS

Borrvall, Thomas, and Joakim Petersson. "Topology optimization of fluids in Stokes flow." International journal for numerical methods in fluids 41.1 (2003): 77-107 (Year: 2003).*

Dede, Ercan M. "Simulation and optimization of heat flow via anisotropic material thermal conductivity." Computational Materials Science 50.2 (2010): 510-515 (Year: 2010).*

Kondo, Shigeru, and Takashi Miura. "Reaction-diffusion model as a framework for understanding biological pattern formation." science 329.5999 (2010): 1616-1620 (Year: 2010).*

Rebrov, Evgeny V., Jaap C. Schouten, and Mart HJM De Croon. "Single-phase fluid flow distribution and heat transfer in microstructured reactors." Chemical Engineering Science 66.7 (2011): 1374-1393 (Year: 2011).*

Choi, Jae Seok, et al. "Topology optimization using a reaction—diffusion equation." Computer Methods in Applied Mechanics and Engineering 200.29-32 (2011): 2407-2420 (Year: 2011).*

Zeng, Shi, and Poh Seng Lee. "A header design method for target flow distribution among parallel channels based on topology optimization." 2018 17th IEEE intersociety conference on thermal and thermomechanical phenomena in electronic systems (ITherm). IEEE, 2018 (Year: 2018).*

Petrovic, Mario, et al. "Thermal performance optimization in electric vehicle power trains by locally orthotropic surface layer design." Journal of Mechanical Design 140.11 (2018): 111413 (Year: 2018).*

Wang, Hongxin, Jie Liu, and Guilin Wen. "Achieving large-scale or high-resolution topology optimization based on Modified BESO and XEFM." arXiv preprint arXiv:1908.07157 (2019) (Year: 2019).*

Garzón-Alvarado, Diego A., C. H. Galeano, and J. M. Mantilla. "Computational examples of reaction-convection-diffusion equations solution under the influence of fluid flow: First example." Applied Mathematical Modelling 36.10 (2012): 5029-5045 (Year: 2012).*

Cera, Luca, and Christoph A. Schalley. "Under diffusion control: from structuring matter to directional motion." Advanced Materials 30.38 (2018): 1707029 (Year: 2018).*

Lakshminarayanan, Varadharajan, and Palaniswamy Karthikeyan. "Optimization of flow channel design and operating parameters on proton exchange membrane fuel cell using MATLAB." Periodica Polytechnica Chemical Engineering 60.3 (2016): 173-180 (Year: 2016).*

Trogadas, P., et al. "A lung-inspired approach to scalable and robust fuel cell design." Energy & Environmental Science 11.1 (2018): 136-143 (Year: 2018).*

CN102299343A, Chen et al., "Leaf biomimetic structure based bipolar plate for proton exchange membrane fuel cells", machine English translation retrieved from https://worldwide.espacenet.com/ Date: Nov. 21, 2023 (Year: 2011).*

CN108155400A, Wang et al., "Fuel battery bipolar plate cooling flow field structure", machine English translation retrieved from https://worldwide.espacenet.com/ Date: Nov. 21, 2023 (Year: 2018).*

CN109616684A. Chang et al., "A Single Die Formed By Proton Exchange Membrane Fuel Cell Metal Bipolar Plate", machine English translation retrieved from https://worldwide.espacenet.com/ Date: Nov. 21, 2023 (Year: 2019).*

Gray, Justin S., et al. "OpenMDAO: An open-source framework for multidisciplinary design, analysis, and optimization." Structural and Multidisciplinary Optimization 59 (2019): 1075-1104 (Year: 2019).*

Behrou, Reza, Alberto Pizzolato, and Antoni Forner-Cuenca. "Topology optimization as a powerful tool to design advanced PEMFCs flow fields." International Journal of Heat and Mass Transfer 135 (2019): 72-92 (Year: 2019).*

CN104821407A, Lu, et al., "Vein-like fuel cell flow field structure, fuel cell bipolar plate, and fuel cell", machine English translation retrieved from https://worldwide.espacenet.com/, Date: May 16, 2024 (Year: 2015).*

Chen et al., "A segmented model for studying water transport in a PEMFC," Journal of Power Sources, vol. 185, 2008, pp. 1179-1192.

Basu et al., "Two-phase flow and maldistribution in gas channels of a polymer electrolyte fuel cell," Journal of Power Sources, vol. 187, 2009, pp. 431-443.

Mulyazmi et al., "Effect of Operating Conditions on the Liquid Water Content Flowing Out of the Cathode Side and the Stability of Pem Fuel Cell Performance," International Journal of Technology, vol. 10, Apr. 2019, pp. 634-643.

Sasmito et al., "Numerical evaluation of various gas and coolant channel designs for high performance liquid-cooled proton exchange membrane fuel cell stacks," Energy, vol. 44, No. 1, 2012, pp. 278-291.

* cited by examiner

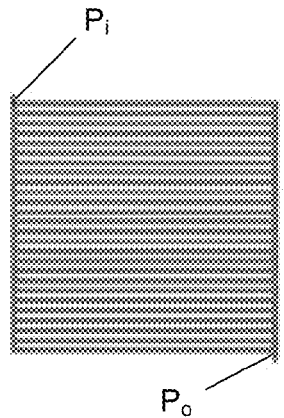 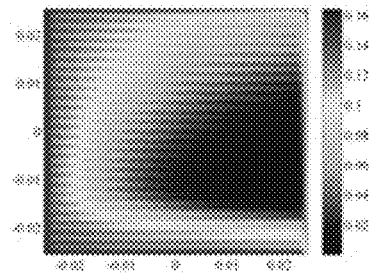 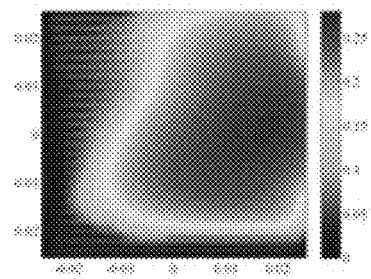
FIG. 7A
(RELATED ART)
FIG. 7B
(RELATED ART)
FIG. 7C
(RELATED ART)
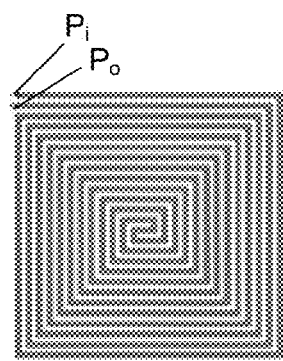 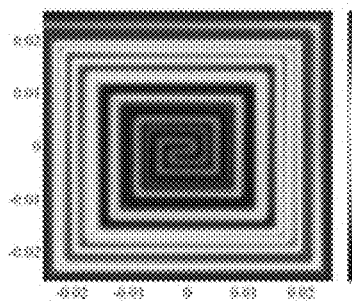 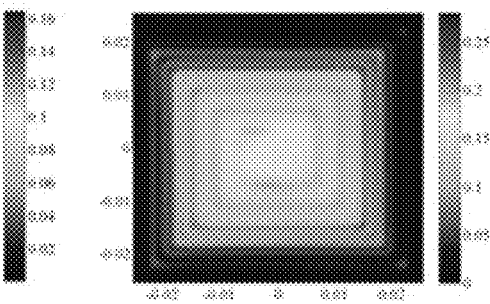
FIG. 8A
(RELATED ART)
FIG. 8B
(RELATED ART)
FIG. 8C
(RELATED ART)

METHOD OF PREDICTING LIQUID REGIONS AND VAPOR REGIONS IN BIPOLAR PLATES OF A FUEL CELL

TECHNICAL FIELD

Embodiments relate generally to one or more methods for designing a fuel cell using a model to predict a location of liquid regions and vapor regions in channels of a plate of the fuel cell.

BACKGROUND

Hydrogen fuel cell (FC) technology has been utilized widely in a variety of stationary and non-stationary applications, e.g., space transport, satellites, motor vehicles, power generation, and electronics. The FC device converts chemical potential energy into electrical energy.

A FC stack generally comprises hundreds of FCs arranged in a stack formation. Each individual FC in the stack may have a structure comprising a membrane electrode assembly (MEA) which is interposed between plates representing electrodes The MEA is as a proton exchange membrane (PEM) cell having sides coated with a catalyst for the hydrogen oxidation (anode) and oxygen reduction (cathode). Gas diffusion layers (GDL) are used to deliver the reactant fuels to the electrodes from bipolar plate channels.

In operation, a first fuel reactant, for example, hydrogen ($H_2$), is supplied to the anode via a hydrogen layer, and a second fuel reactant, for example, oxygen ($O_2$) is supplied to the cathode via an air layer. Hydrogen and air enter the FC stack and mix within the reaction region of the MEA and flow through channels formed in the hydrogen layer and the air layer to produce electricity, with water and heat as reaction byproducts.

Additionally, coolant also enters and exits the FC stack and flows outside of the reaction zones within coolant channels defined by the opposite sides of the hydrogen plate and the air plate. In compact configurations, coolant channels are defined by the opposite sides of the hydrogen plate and the air plate. In such configurations, however, the coolant channels are very narrow or completely blocked, while in other regions the coolant channels are wide and open. This may lead to non-uniform cooling throughout the FC stack, and consequently, inefficient FC stack performance.

An additional problem with FC performance is liquid saturation (i.e., flooding) as a result of water condensation produced as a byproduct of the reaction during the production of electricity by the FC. The undesirable build-up of water, causing a phenomena called flooding, can occur in the microchannels of the air layer, thereby blocking, restricting, and/or limiting air flow and/or hydrogen flow. Water condensation at the air layer makes oxygen less available to generate electricity, thus making the performance of the FC becomes less reliable.

As the FC technology moves towards the cost-aware commercial sectors, the challenge of designing high performance, low cost, lightweight, and compact FC stacks has sparked trending interests in novel configuration design of fluid flow networks in FC bipolar plates.

In the design of FCs, an inverse design approach has been used in which the design of flow fields is formulated as a material (i.e., channel or wall) distribution problem. The use of inverse design methods for designing FC bipolar plates, however, has been limited to a single layer configuration. Contemporary design methods generally use explicit topology optimization, which are inevitably expensive in computation. Consequently, resultant designs from the topology optimization methods all have a reduced number of channels, as opposed to hundreds of channels.

BRIEF SUMMARY

In accordance with one or more embodiments, one or more methods are provided to predict liquid saturation regions of an FC plate, and providing material properties of the liquid and vapor at these regions when executing an optimization method to design fluid flow networks for a FC.

In accordance with one or more embodiments, one or more methods are implemented where one or more regions of the air layer of an FC plate is inhibited by saturation or flooding by the water produced. A reiterative method determines one or more regions in the microchannels of the air layer where the oxygen concentration is less than a predetermined threshold concentration where densities and dynamic viscosities of water in the microchannels are applied thereto, while repetitively executing an algorithm until a convergence occurs. Maps are generated illustrating phase composition and oxygen distribution by the application or absence of the two-phase model. The model-determined conditions are then used to optimize design of the FC plate to minimize flooding while maximizing performance.

In accordance with one or more embodiments, a FC comprises bipolar plates having multi-scale, multi-layer Turing-pattern microstructures for efficient fluid distribution. Such Turing-patterned microstructures provide for a reduction in size of the FC. Such efficient fluid distribution yields enhanced operational performance in the FC stack by facilitating more uniform cooling of the MEA at the coolant layer. Such uniform cooling, in turn, facilitates more uniform reactions at the MEA, and thus, maximizes the generation of electricity by the FC stack.

In accordance with one or more embodiments, steady-state fluid flow physics is coupled with a chemical reaction model to simulate the multiphysics phenomena inside FC stacks. To reflect the stamped and stacked configuration among the air layer, hydrogen layer, and coolant layer of the FC, their geometric dependency is modeled by assigning design variables to the air layer and the hydrogen layer, with the resulting coolant layer configuration being a function of the design variables of the air layer and the hydrogen layer.

In accordance with one or more embodiments, one or more dehomogenization-based methods may comprise: predicting liquid regions and vapor regions in an FC plate, and then implementing a two-stage design method that comprises a porous media optimization stage and a dehomogenization stage. The initial porous media optimization stage is applied based on the prediction determination, and comprises conducting multi-physics finite element analysis, wherein relatively coarse discretization is used to drastically reduce the computational effort and material properties (such as dynamic viscosity and density) are applied as inputs based on the prediction. At the subsequent dehomogenization stage, the domain discretization is refined to extract intricate explicit Turing flow channels.

In accordance with one or more embodiments, one or more dehomogenization-based methods may comprise: predicting liquid regions and vapor regions in an FC plate, and implementing, based on the prediction determination, a flow optimization process with an inverse permeability expression to iteratively design the optimized porous media. The optimization process applies, to the air layer and the hydrogen layer, design variables and material properties (such as dynamic viscosity and density) as inputs based on the prediction, and objective functions to all three layers (i.e., the air layer, the hydrogen layer, and the coolant layer). Thus, in accordance with one or more methods set forth, described, and/or illustrated herein, all three layers are optimized simultaneously.

In accordance with one or more embodiments, a method of designing a fuel cell may comprise one or more of the following: by one or more computing devices having one or more processors: predicting a location of one or more liquid regions and one or more vapor regions in channels at an air layer of a plate of the fuel cell, and then simultaneously optimizing, based on the prediction and via homogenized flow optimization, fluid flow networks for the air layer, a hydrogen layer, and a coolant layer of the fuel cell; and generating, based on the homogenized flow optimization, one or more multi-scale Turing-patterned microstructures for the air layer and the hydrogen layer.

In accordance with one or more embodiments, a method of designing a fuel cell may comprise one or more of the following: by one or more computing devices having one or more processors: predicting a location of one or more liquid regions and one or more vapor regions in channels at an air layer of a plate of the fuel cell, and then simultaneously optimizing, based on the prediction and via homogenized flow optimization, fluid flow networks for the air layer, a hydrogen layer, and a coolant layer of the fuel cell; generating, based on the homogenized flow optimization, one or more multi-scale Turing-patterned microstructures for the air layer and the hydrogen layer; and stacking the air layer and the hydrogen layer to generate one or more multi-scale Turing-patterned microstructures for the coolant layer.

In accordance with one or more embodiments, a method of designing a fuel cell may comprise one or more of the following: by one or more computing devices having one or more processors: predicting a location of one or more liquid regions and one or more vapor regions in channels of an air layer of a plate of the fuel cell, and then optimizing, via homogenized flow optimization, fluid flow networks for the air layer based on the prediction; and generating, in response to the optimizing, one or more multi-scale Turing-patterned microstructures for the air layer.

In accordance with one or more embodiments, a method of predicting a location of liquid regions and vapor regions in channels of a plate of the fuel cell may comprise one or more of the following: by one or more computing devices having one or more processors: executing an optimization simulation to identify, in the channels of the air layer, one or more regions where oxygen concentration is less than a predetermined threshold concentration; applying material properties of a liquid phase and a vapor phase to the identified one or more regions; and reiteratively executing the optimization method until a convergence occurs between the liquid phase and the vapor phase of the air layer.

At the dehomogenization stage, using results from the porous media optimization, anisotropic diffusion coefficient tensors for reaction-diffusion equations are propagated through time to generate one or more Turing-patterned microstructures for the air layer and the hydrogen layer. The resultant channels are multi-scale in that a larger flow structure interfaces with smaller flow structures.

In accordance with one or more embodiments, at each optimization iteration, after completing an initial stage of predicting liquid regions and vapor regions, a second stage of porous medium optimization is implemented based on the prediction determination. After the optimization is completed, Turing-pattern dehomogenization is applied to extract intricate explicit channel designs while recovering the optimized porous medium performance. While design variables are only assigned to the air layer and the hydrogen layer based on the stacked configuration of the air layer and the hydrogen layer, the coolant layer configuration is described as a function of design variables in the air layer and the hydrogen layer. The multi-physics equilibrium is governed by partial differential equations (PDEs), which simulate the fluid flow and chemical reaction. The gradient-based optimization of porous medium is guided by solving PDE state variables and conducting sensitivity analysis at each optimization iteration.

Compared with explicit topology optimization methods, the one or more dehomogenization-based methods set forth, described, and/or illustrated herein decouples the numerical mesh/grid resolution required during optimization with the final explicit design. In the porous media optimization stage, where multiphysics finite element analysis is conducted, relatively coarse mesh discretization can be used to drastically reduce the computational effort. In the subsequent dehomogenization stage, the domain mesh discretization is refined to extract intricate explicit channels.

In accordance with one or more embodiments, a method of designing fluid flow networks for a fuel cell may comprise, by one or more computing devices having one or more processors: predicting liquid regions and vapor regions in an FC plate; simultaneously optimizing, via homogenized flow optimization and applying material properties (such as dynamic viscosity and density) as inputs based on the prediction, an air layer, a hydrogen layer, and a coolant layer of the fuel cell, using material; and generating, in response to the optimizing, one or more multi-scale Turing-patterned microstructures over the air layer and the hydrogen layer to define the coolant layer.

A plurality of optimized designs reflecting various designer preferences may be achieved in accordance with one or more of the methods set forth, described and/or illustrated herein. While the proposed framework does not assume any biomimetic layout beforehand, certain optimized designs look and behave similarly as blood vessels and lungs in a cardiovascular system.

BRIEF DESCRIPTION OF THE SEVERAL VIEWS OF THE DRAWINGS

The patent or application file contains at least one drawing executed in color. Copies of this patent or patent application publication with color drawing(s) will be provided by the Office upon request and payment of the necessary fee.

The various advantages of the embodiments of the present invention will become apparent to one skilled in the art by reading the following specification and appended claims, and by referencing the following drawings, in which:

FIGS. 7A to 7C illustrate an oxygen concentration distribution and liquid saturation distribution map in a first microchannel configuration of the related art.

FIGS. 8A to 8C illustrate an oxygen concentration distribution and liquid saturation distribution map in a second microchannel configuration of the related art.

DETAILED DESCRIPTION

Figure 1:
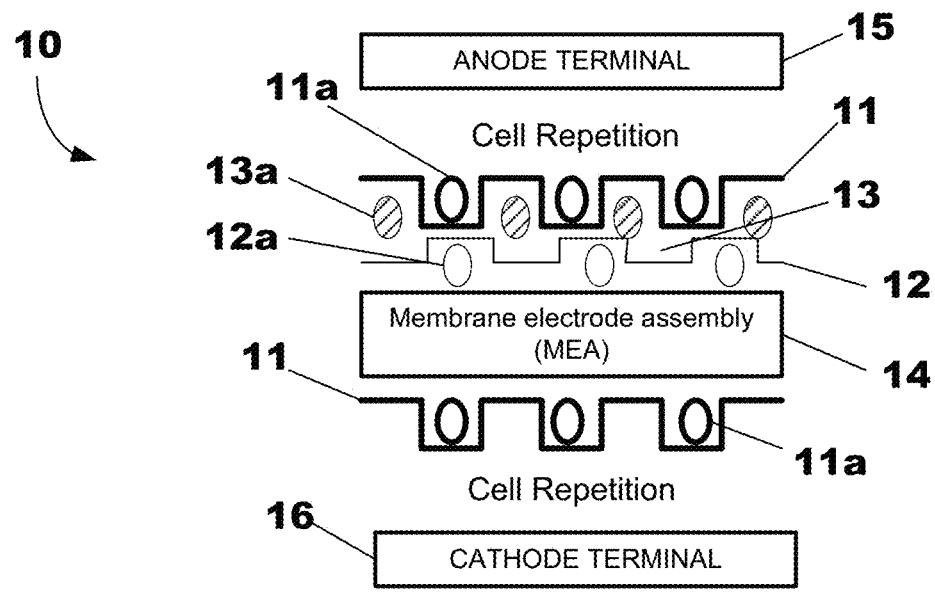
FIG. 1 illustrates a configuration of a stacked FC bipolar plate, in accordance with one or more embodiments shown and described herein.

As illustrated in FIG. 1, a fuel cell 10 comprises a first bipolar plate comprising a first stamped metal plate or layer 11 (serving as the anode), a second stamped metal plate or layer 12 (serving as the cathode), and an MEA membrane 14 interposed therebetween. An anode terminal electrode 15 is electrically connected to the anode 11, while a cathode terminal electrode 16 is electrically connected to the cathode 12.

The first stamped metal plate or layer 11 has a plurality of independently formed air fluid flow networks 11a, and the second stamped metal plate or layer 12 has a plurality of independently formed hydrogen fluid flow networks 12a. Through the stacking of the first stamped metal plate 11 and the second stamped metal plate 12, a coolant layer 13 comprising a plurality of coolant flow networks 13a is defined. In this way, the coolant fluid flow network configuration 13a is dependent upon the independently-formed air networks 11a and hydrogen channels 12a.

The local permeability of the coolant flow networks 13a is highest where both the air layer 11 and the hydrogen layer 12 are walls. The local permeability of the coolant flow networks 13a is moderate where either the air layer 11 or the hydrogen layer 12 is a channel (or wall). Finally, the local permeability of the coolant flow networks 13a is lowest where both the air layer 11 and the hydrogen layer 12 are channels.

The simultaneous design of the air flow networks 11a, the hydrogen flow networks 12a, and the coolant flow networks 13a in FC stacks is formulated as a multi-objective optimization problem.

Figure 2:
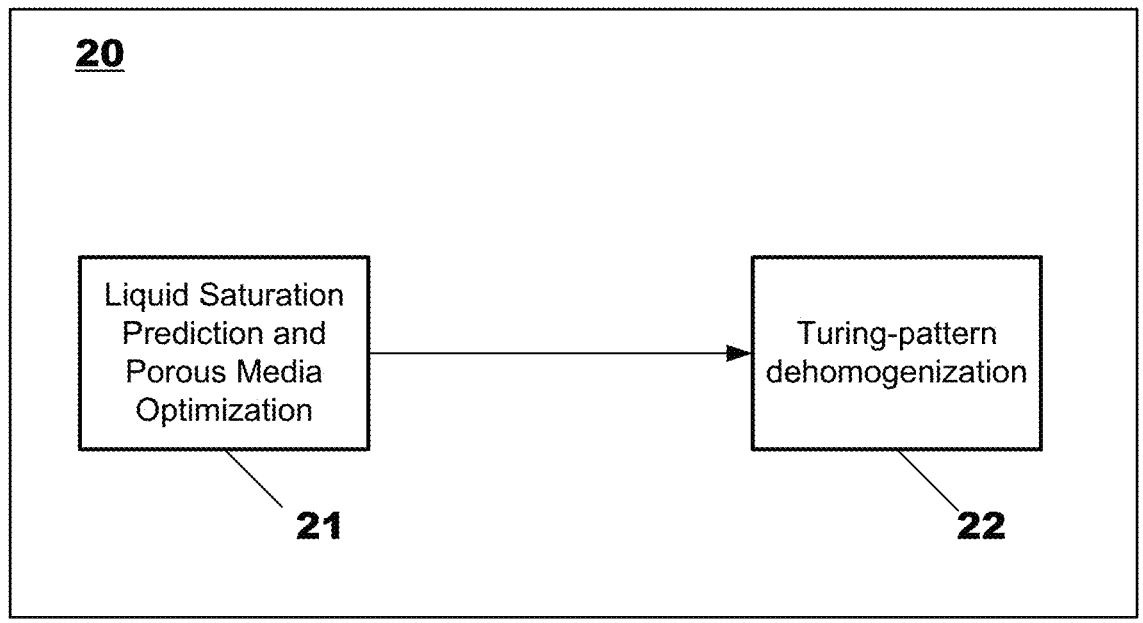
FIG. 2 illustrates a diagram of the method of designing air, hydrogen, and coolant flow networks in FC bipolar plates, in accordance with one or more embodiments shown and described herein.

As illustrated in FIG. 2, in accordance with one or more embodiments, one or more dehomogenization-based methods comprises implementation of a three-stage design process 20 which includes: a liquid saturation prediction stage 21, a porous media optimization stage 22, and a Turing pattern dehomogenization stage 23. At the liquid saturation prediction stage 21, a reiterative method is to determine regions of the FC plate where the oxygen concentration is below a predetermined threshold where densities and viscosities of the fluid in the air channels are applied to those regions while repetitively executing an algorithm until a convergence occurs.

At the porous media optimization stage 21, where multi-physics finite element analysis is conducted, relatively coarse discretization is used to drastically reduce the computational effort. The subsequent Turing pattern de-homogenization stage 22 is then applied to extract intricate explicit fluid flow network or channel designs while recovering the optimized porous medium performance.

Model Assumptions

To balance the model accuracy and complexity for use of gradient-based optimization, several assumptions are made as follows.

The flow physics of air, hydrogen, and coolant is assumed incompressible and laminar with a low Reynolds number (e.g. <2100).

The simulation model assumes an isothermal system. It is acknowledged that thermal management is a significant topic. Temperature affects various physics inside FC stacks including, e.g., liquid water condensation, fluid flow, and chemical reaction. While the temperature field is not explicitly solved, the thermal management is indirectly considered by defining the coolant flow uniformity objective in the coolant layer 13. The explicit modeling of conjugate heat transfer and its coupling with flow and reaction physics is left for future work.

A chemical reaction is assumed to be dominated by the air supply from the cathode side. The current density is assumed linearly proportional to the oxygen concentration. The hydrogen supply from the anode side is assumed sufficient. The flow uniformity in the hydrogen flow networks 11a is set as an objective to support this assumption. It is noted that more comprehensive reaction model, e.g., the Butler-Volmer equation, has been used in related works, which is left for future improvement.

Simulation models require many numerical constants, e.g., reaction rate and diffusion coefficient. The appropriate setting depends on material selection and requires experimental validation, which is not the focus of this paper.

Design Fields

Figure 3A:
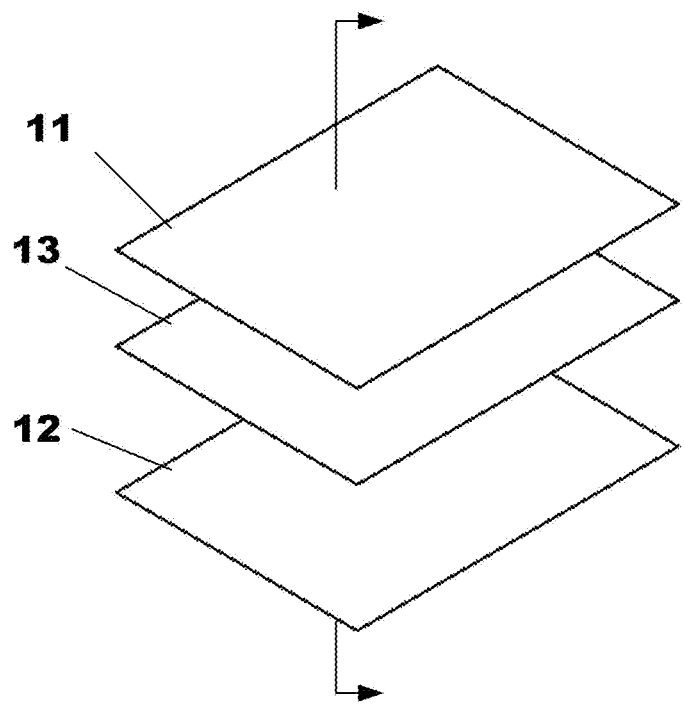
FIGS. 3A and 3B illustrate fluid flow network design fields, in accordance with one or more embodiments shown and described herein.
Figure 3B:
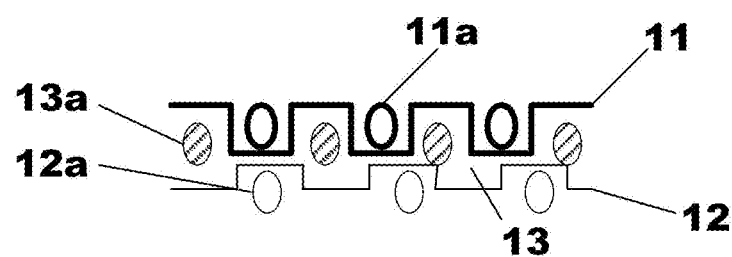

As illustrated in FIGS. 3A and 3B, the simultaneous design of air, hydrogen, and coolant flow networks 11a, 12a, and 13 requires only two design fields in the air layer 11 (design field: $\phi^{(a)}$) and the hydrogen layer 12 (design field: $\phi^{(h)}$), bounded between −1 and 1. The resulting design of the coolant layer 13 is a by-product of designing the air layer 11 and the hydrogen layer 12, and thus, is determined by $\phi^{(a)}$ and $\phi^{(h)}$.

Design variables are regularized by Helmholtz PDE filters:

$$-r^{(a)2}\nabla^2\tilde{\phi}^{(a)}+\tilde{\phi}^{(a)}=\phi^{(a)} \quad (1a)$$

$$-r^{(h)2}\nabla^2\tilde{\phi}^{(h)}+\tilde{\phi}^{(h)}=\phi^{(h)} \quad (1b)$$

where $r^{(a)}$ and $r^{(h)}$ are filter radius governing the smoothness of the optimized porous medium. A smoothed Heaviside projection is used to obtain the regularized design variables $\gamma^{(a)}$ and $\gamma^{(h)}$, ranging between 0 and 1. $\gamma=0$ indicates the lowest porosity (i.e., smallest permeability) whereas $\gamma=1$ indicates the highest porosity (i.e., greatest permeability).

Homogenized Permeability

Figure 4A:
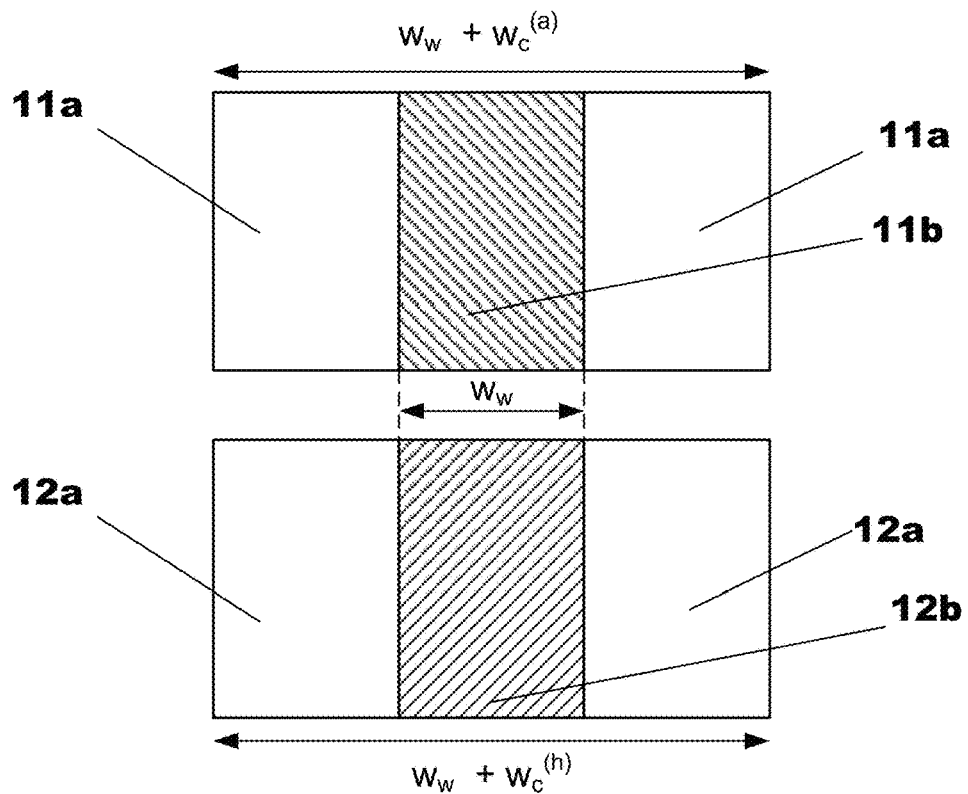
FIGS. 4A to 4C illustrate unit cell channel geometries for different layers, in accordance with one or more embodiments shown and described herein.
Figure 4B:
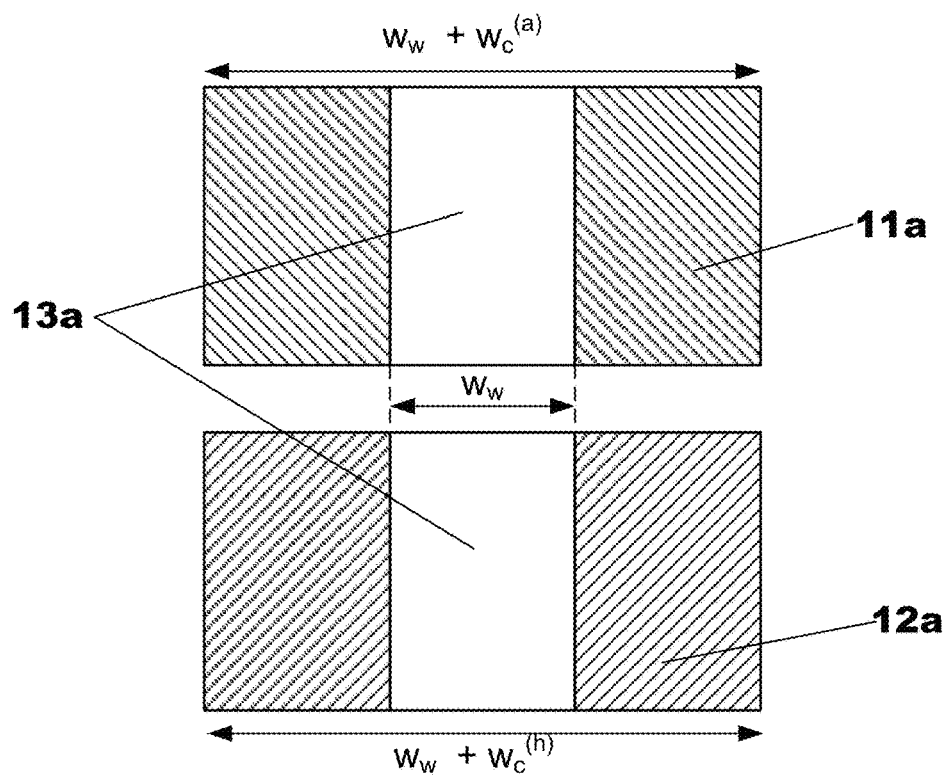
Figure 4C:
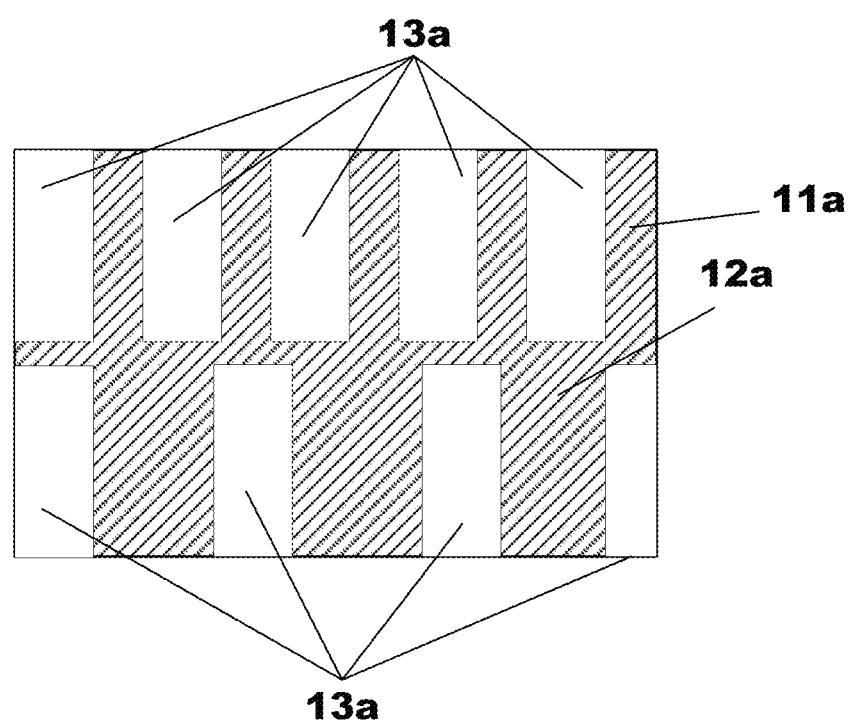
Figure 5:
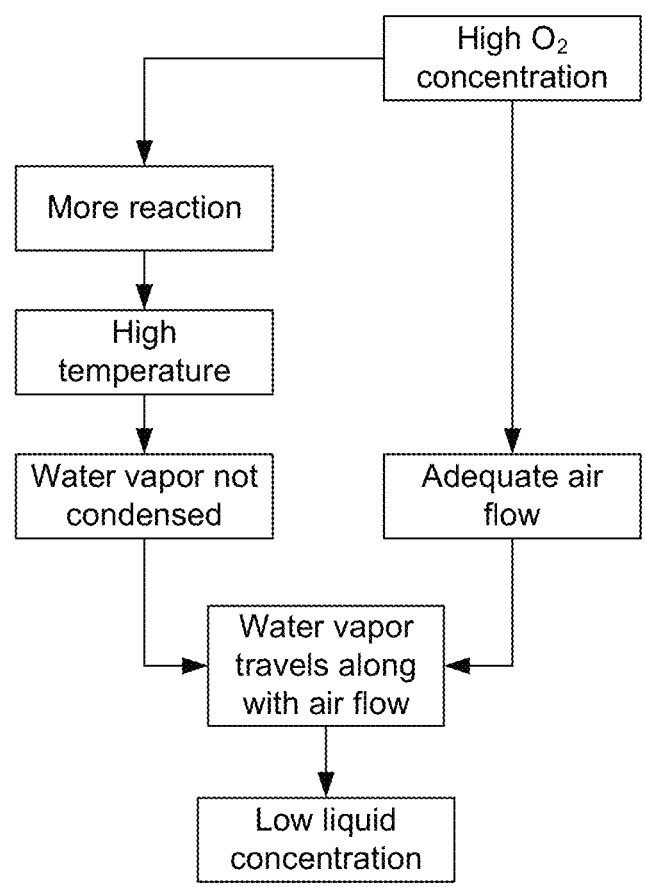
FIG. 5 illustrates a block diagram of FC plate performance characteristics at air layer regions of high oxygen concentration.
Figure 6:
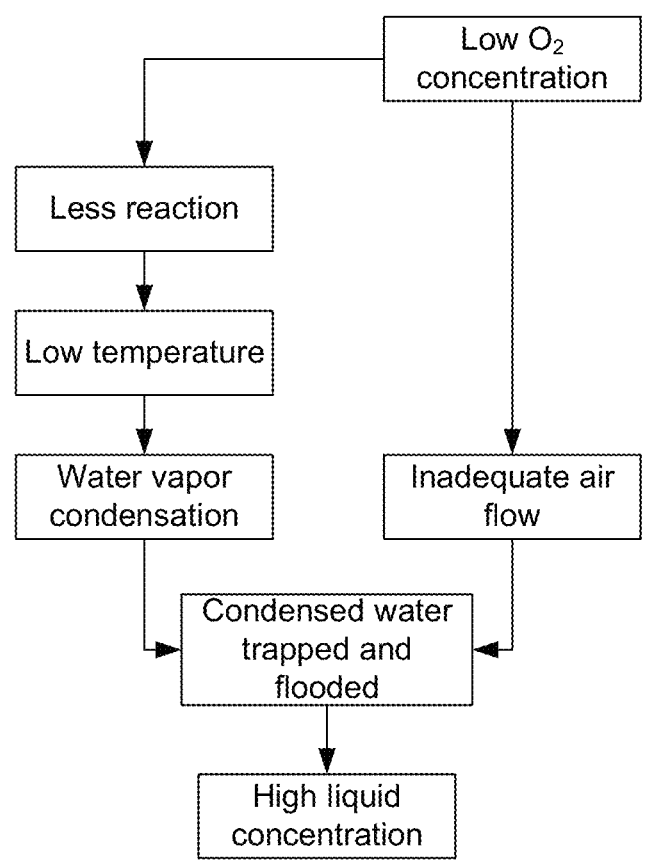
FIG. 6 illustrates a block diagram of FC plate performance characteristics at air layer regions of low oxygen concentration.

The porous media of the air layer 11 and the hydrogen layer 12 is parameterized with spatially varying channel structures. FIGS. 4A to 4C illustrate unit cell channel geometries for different layers. In both the air layer 11 and the hydrogen layer 12, the wall width is fixed as $w_w$. Their local channel widths are parameterized as $w_c^{(a)}$ and $w_c^{(h)}$, respectively.

The equivalent permeability in the air layer 11 and the hydrogen layer 12 is defined with respect to local channel widths $w_c^{(a)}$ and $w_c^{(h)}$ in two-dimensions (2-D), i.e., assuming infinite out-of-plane length, as follows. Note that this disclosure contemplates other permeability maps or parametrizations based on three-dimensional porous materials.

$$k^{(a)} = \frac{w_c^{(a)3}}{12(w_w + w_c^{(a)})} \tag{2a}$$

$$k^{(h)} = \frac{w_c^{(h)3}}{12(w_w + w_c^{(h)})}, \tag{2b}$$

After stacking, walls 11b in the air layer 11 and walls 12b the hydrogen layer 12 define half-channels 13a in the coolant layer 13. Networks 11a in the air layer 11 and networks 12a in the hydrogen layer 12 define half-walls in the coolant layer 13. Since the air layer 11 and the hydrogen layer 12 are stacked in parallel, and the layer depth effect is not considered due to the 2-D approximation, the resulting equivalent coolant layer permeability is derived in this case as follows:

$$k^{(c,a)} = \frac{w_w^3}{12(w_w + w_c^{(a)})} \tag{3a}$$

$$k^{(c,h)} = \frac{w_w^3}{12(w_w + w_c^{(h)})} \tag{3b}$$

$$k^{(c)} = \frac{k^{(c,a)} + k^{(c,h)}}{2} \tag{3c}$$

where $k^{(c,a)}$ is the coolant layer permeability from the air side, $k^{(c,h)}$ is the coolant layer 13 permeability from the hydrogen side, and $k^{(c)}$ is the combined coolant layer effective permeability.

A linear interpolation function is used to map the regularized design fields $\gamma^{(a)}$ and $\gamma^{(h)}$ to the prescribed minimum and maximum channel widths $w_{c\,min}$ and $w_{c\,max}$ as follows:

$$w_c^{(a)} = w_{c\,min} + (w_{c\,max} - w_{c\,min})\gamma^{(a)} \tag{4a}$$

$$w_c^{(h)} = w_{c\,min} + (w_{c\,max} - w_{c\,min})\gamma^{(h)} \tag{4a}$$

While an identical channel width range is assigned to both the air layer 11 and the hydrogen layer 12, they can be set differently to the extent necessary.

Governing Physics

Based on the aforementioned model assumptions, the governing physics inside FC stacks is simplified to Navier-stokes equations in the air layer 11, the hydrogen layer 12, and the coolant layer 13, with an advection-diffusion-reaction equation in the air layer 11.

The flow physics assuming incompressible laminar flow in porous media is governed by the Navier-stokes equations:

$$\rho^{(n)}(u^{(n)} \cdot \nabla)u^{(n)} = -\nabla p^{(n)} + \nabla \cdot (\mu^{(n)}(\nabla u^{(n)} + (\nabla u^{(n)})^T)) - \mu^{(n)} \alpha^{(n)} u^{(n)}, \tag{5}$$

Subject to the continuity equation $\nabla^{(n)} \cdot (u^{(n)}) = 0$, which conserves the mass. Note that n is air, hydrogen, or coolant for the respective layer, and $\rho^{(n)}$, $\mu^{(n)}$, $u^{(n)}$, and $p^{(n)}$ are the corresponding fluid density, fluid dynamic viscosity, fluid velocity (state variables), and pressure (state variables) respectively, and $\alpha^{(n)} = 1/k^{(n)}$ is the effective inverse permeability. As discussed herein, $\alpha^{(a)}$ is a function of $\gamma^{(a)}$, $\alpha^{(h)}$ is a function of $\gamma^{(h)}$, and $\alpha^{(c)}$ is a function of both $\gamma^{(a)}$ and $\gamma^{(h)}$. It is noted that while the channel design in the coolant layer is geometrically coupled with the channel designs in the other two layers, the physics state variables $u^{(n)}$ and $p^{(n)}$ are solved independently for each layer using three sets of Navier-stokes equations.

To model the reaction physics, the solved velocity $u^{(a)}$ from the air layer is fed into an advection-diffusion-reaction equation as follows:

$$\nabla \cdot (-D\nabla c) + u^{(a)} \cdot \nabla c = r \tag{6a}$$

$$r = -\beta c, \tag{6b}$$

where c is the concentration (state variables), r is the local reaction rate, assumed linear proportional to the concentration, D is the diffusion coefficient and is the reaction rate coefficient.

In practical FC systems, thermal management and water management are two critical concerns. The resulting temperature distribution across an entire plate is affected by local reaction and coolant flow. Chemical reaction is also sensitive to the operating temperature. The local reaction rate affects the amount of water vapor being generated, which may lead to water droplet condensation and even flooding inside the channels. Since air and water vapor (or water droplets) share the same channel configuration, two-phase flow is often observed inside FC air channels. Such multiphysics phenomena are challenging for numerical simulations, let along design optimization. Model assumptions and simplification are required for use of design optimization, especially gradient-based optimization. The integration of more complicated physics into the current design framework is left for future research. The computational model used in this paper assumes isothermal systems and single-phase flow.

The single-phase flow model disclosed herein is further simplified to be laminar and incompressible. While more comprehensive chemical reaction models, e.g., the Butler-Volmer model, are available, a simplified linear model is used in this paper, which also assumes sufficient hydrogen supply. The integration of turbulent flow physics and more detailed reaction model to the current design framework is also left for future research.

Multiple Objectives

Based on model assumptions and design requirements, five objectives are identified and summarized as follows:

$$f_1 = \int_{D^{(a)}} \beta c \, d\Omega \tag{7a}$$

-continued $$f_2 = \int_{D(a)} \left(\frac{c - c_{avg}}{c_{avg}}\right)^2 d\Omega \quad (7b)$$

$$f_3 = \int_{D(a)} \left(\frac{1}{2}\mu^{(c)}\Sigma_{i,j}\left(\frac{\partial u_i^{(c)}}{\partial x_j} + \frac{\partial u_j^{(c)}}{\partial x_i}\right)^2 + \mu^{(c)}\Sigma_i(\alpha^{(c)}u_i^{(c)2})\right) d\Omega \quad (7c)$$

$$f_4 = \int_{S(c)} \left(\frac{|u^{(c)}| - |u^{(c)}|_{avg}}{|u^{(h)}|_{avg}}\right)^2 d\Omega \quad (7d)$$

$$f_5 = \int_{S(h)} \left(\frac{|u^{(h)}| - |u^{(h)}|_{avg}}{|u^{(h)}|_{avg}}\right)^2 d\Omega \quad (7e)$$

where $D^{(n)}$ is the design domain across the entire layer. $S^{(n)}$ is the selected strip domains for evaluating flow uniformity, $|u^{(n)}|$ is the flow velocity magnitude, $|u^{(n)}|_{avg}$ is the average flow velocity magnitude inside selected strip domains, $f_1$ is the (negative) total reaction measure, $f_2$ is the uniform reaction measure, $f_3$ is the coolant flow resistance, and $f_4$ and $f_5$ are the flow uniformity measure in the coolant layer and the hydrogen layer, respectively. Note that not all optimization objective may be used.

Optimization Formulation

As the first step, the porous media optimization problem is formulated as follows:

Minimize: $f = w_1 f_1 + w_2 f_2 + w_3 f_3 + w_4 f_4 + w_5 f_5$, $\phi^{(a)}, \phi^{(h)}$ Subject to: $\phi^{(a)} \in [-1,1]^{D^{(a)}}$, $\phi^{(h)} \in [-1,1]^{D^{(h)}}$, \quad (8)

design variable regularization, Eq. (1),
porous media parameterization, Eq. (2-4),
multiphysics equilibrium, Eq. (5 and 6),
where the combined multi-objective function is the weighted sum of all objective terms, and $w_i$ is the weighting factor for objective i. Different settings of weighting factors reflect design requirements and preferences, which will lead to different optimized designs. $\phi^{(a)}$ is a design variable assigned to the air layer, and $\phi^{(h)}$ is a design variable assigned to the hydrogen layer. The design variable regularization, porous media parameterization, and multiphysics equilibrium are previously set forth herein.

Turing Pattern Dehomogenization

As the second step, the intricate explicit channels can be extracted using Turing pattern dehomogenization, which will recover the flow and reaction performance from the prior porous media optimization step.

The time-dependent Turing reaction-diffusion system involves two hypothetical chemical substances $U^{(n)}$ and $V^{(n)}$, which diffuse in the space around and enhance or suppress the reproduction of themselves. The partial differential equation governing this process can be written as follows:

$$\frac{\partial U^{(n)}}{\partial t} = \nabla \cdot D_u^{(n)} \nabla U^{(n)} + R_u^{(n)}(U^{(n)}, V^{(n)}), \quad (9a)$$

$$\frac{\partial U^{(n)}}{\partial t} = \nabla \cdot D_v^{(n)} \nabla U^{(n)} + R_v^{(n)}(U^{(n)}, V^{(n)}), \quad (9b)$$

where n is air or hydrogen for the respective layer, $R_u^{(n)}$ and $R_v^{(n)}$ are the interactive reaction terms, and $D_u^{(n)}$ and $D_v^{(n)}$ are the diffusion coefficients. The optimized design field $\phi^{(n)}$ is embedded in the extended anisotropic diffusion tensors $D_u^{(n)}$ and $D_v^{(n)}$ to recover the corresponding channel width $w_c^{(n)}$. The fluid velocity $u^{(n)}$ is aligned with the principal axis of the diffusion tensors.

The Turing-pattern dehomogenization process efficiently generates intricate explicit channel designs based on the optimized porous media.

Prediction Model

In order to address the issue of flooding, one or more embodiments are to provide a model to predict one or more liquid regions and one or more vapor regions of an FC plate, and thereby assign material properties to the liquid and vapor at the predicted liquid regions and vapor regions as inputs when executing the optimization method as set forth, described, and/or illustrated herein. The model determines conditions used to optimize design of the FC plates such that flooding is minimized, and power generation is maximized.

FIGS. 7A to 7C and 8A to 8C respectively illustrate, as set forth in Sasmito et al., "Numerical evaluation of various gas and coolant channel designs for high performance liquid-cooled proton exchange membrane fuel cell stacks," *Energy*, vol. 44, no. 1, pp. 278-291, (2012), observations of oxygen concentration distribution and liquid saturation distribution maps of two example microchannel configurations for an example FC plate. FIGS. 7A and 8A illustrate an example channel configuration, FIGS. 7B and 8B illustrate oxygen concentration for each example channel configuration, and FIGS. 7C and 7C illustrate liquid saturation for each example channel configuration. From these observations are the model assumptions set forth, described, and/or illustrated herein.

In the example microchannel configuration illustrated in FIG. 7A, fluid enters the FC plate at the inlet Pi at the upper left corner of the plate and flows along a horizontal path through the channel to exit at the outlet $P_{o[YZ(1)]}$ at the lower right corner of the plate. As illustrated in FIG. 7B, oxygen concentration is greater in areas shaded in red, and is lowest in areas shaded in blue. In the illustrated example, oxygen concentration is highest in regions near the inlet Pi and along the side edges of the FC plate, and lowest in regions away from the inlet Pi and in the center of the FC plate. The liquid saturation distribution map illustrated in FIG. 7C reveals an inverse correlation between oxygen concentration and liquid saturation, in which liquid saturation is lowest in regions near the inlet Pi and along the side edges of the FC plate, and highest in regions away from the inlet Pi and in the center of the FC plate.

In the example microchannel configuration illustrated in FIG. 8A, fluid enters the FC plate at the inlet Pi at the upper left corner of the plate and flows along a spiral or serpentine-type path from left to right of the illustration to exit at the outlet $P_{o[YZ(2)]}$ at the upper left corner of the plate. As illustrated in FIG. 8B, oxygen concentration is highest in the outer regions of the plate adjacent to the inlet Pi and the outlet $P_o$. Oxygen concentration distribution is lowest in regions in the center of the FC plate. The liquid saturation map illustrated in FIG. 8C again reveals an inverse correlation between oxygen concentration and liquid saturation, in which liquid saturation is lowest in the outer regions of the plate adjacent to the inlet Pi and the outlet $P_o$, and highest in the center of the FC plate.

In accordance with one or more embodiments, based on this inverse correlation between oxygen concentration and liquid saturation, there is an assumption of some separation between the liquid phase ($\rho^l$, $\mu^l$) and the gas phase ($\rho^g$, $\mu^g$). Accordingly, where the oxygen concentration is high it is assumed there is a gas phase, and where the oxygen concentration is below a predetermined threshold level, there is a liquid phase. In accordance with one or more embodiments, for the liquid phase and the gas phase, in a flow solution, uses a density material physical parameter ($\rho^l$, $\rho^g$) and a dynamic viscosity material physical parameter ($\mu^l$, $\mu^g$).

Figure 9A:
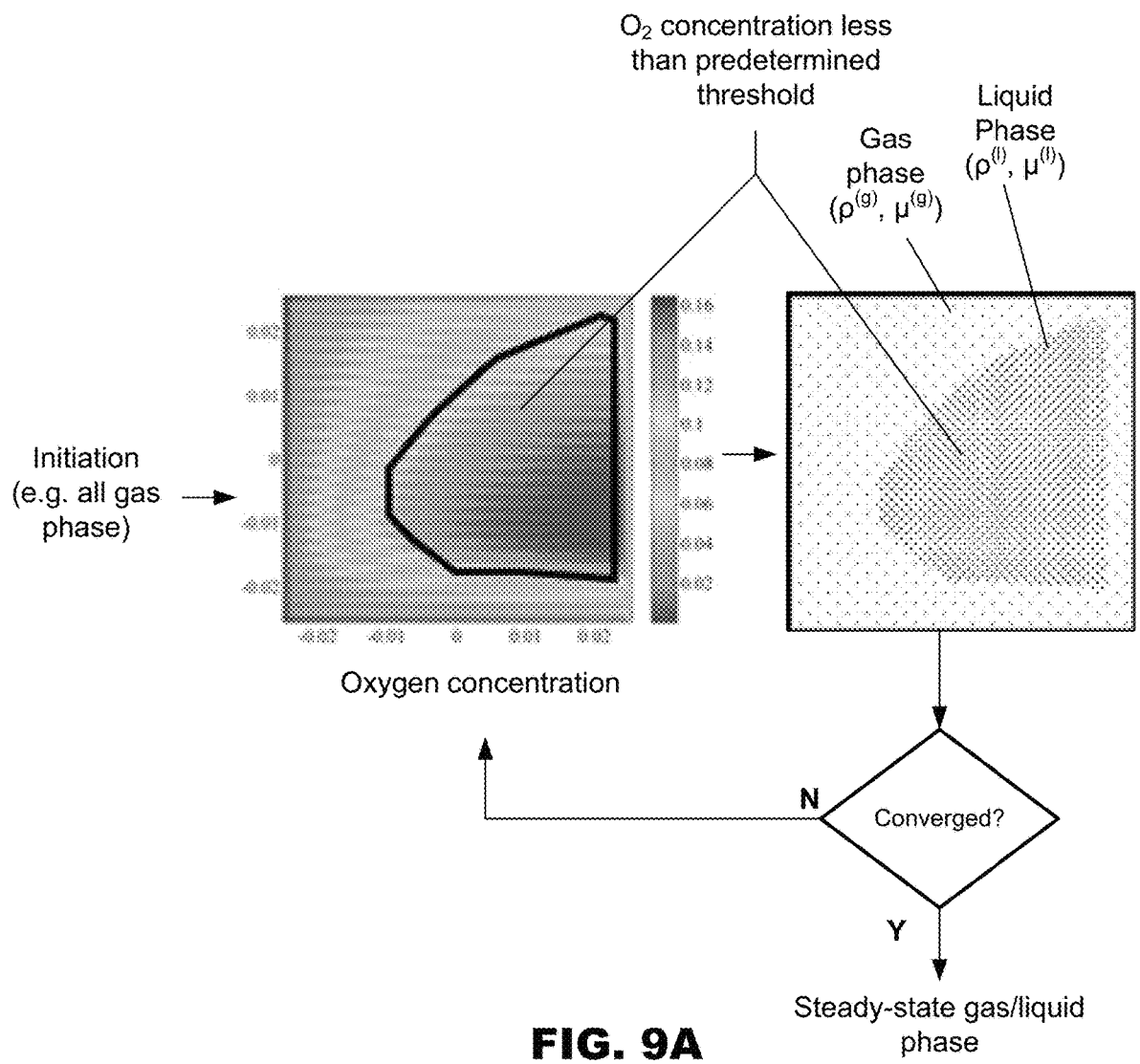
FIGS. 9A to 9C illustrate a model to predict regions of liquid saturation in an FC plate, in accordance with one or more embodiments shown and described herein.
Figure 9B:
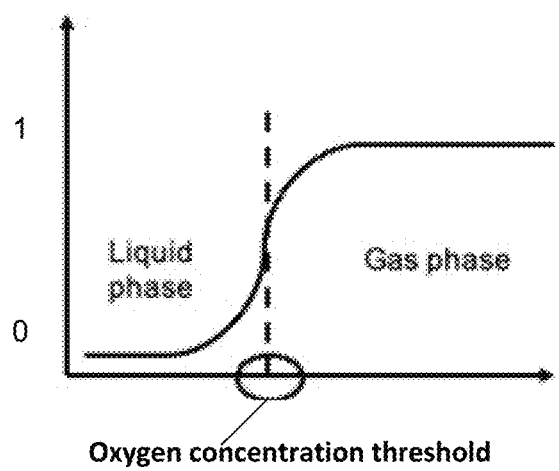
Figure 9C:
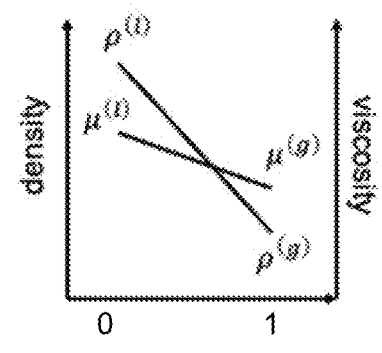

FIGS. 9A to 9C, in accordance with one or more embodiments, an optimization method is conducted in which one or more regions within the air layer are inhibited by saturation or flooding by water condensation. A reiterative method is applied to determine one or more regions of the FC plate where the oxygen concentration is below a predetermined threshold where densities and dynamic viscosities of the fluid in the air channels are applied to those regions while repetitively executing an algorithm until a convergence occurs. The oxygen distribution (FIG. 9B) and the phase composition (FIG. 9C) are indicated in the maps generated by the application or absence of the two-phase model. The model is to determine conditions used to optimize design of multi-layered channels in the FC plates having unique dendritic patterns that mimic nature which minimize flooding while maximizing power generation.

As illustrated in FIG. 9B, the model uses an assumption of the existence of an oxygen concentration threshold when going from a liquid phase to a gas phase. Based on the oxygen concentration threshold, will switch between the material physical parameter for the liquid phase ($\rho^l$, $\rho^l$) and the gas phase ($\mu^g$, $\mu^g$) in the modeling of fluid flow at the air layer.

Based on the chart illustrated in FIG. 9C, as an example, in the model, if the phase indicator is 1 there is a gas phase, and if the phase indicator is 0 there is a liquid phase.

Thus, as illustrated in FIG. 9A, the model is executed to create the maps illustrated in FIGS. 9B and 9C. The region of the map where the oxygen concentration is below a certain threshold is noted. Material properties such as density and dynamic viscosity are applied to the corresponding regions and the model is executed repetitively until the map no longer changes, which indicates there is convergence and the material properties are passed to the second process block, i.e., the optimization method set forth, described, and/or illustrated herein.

Figure 10A:
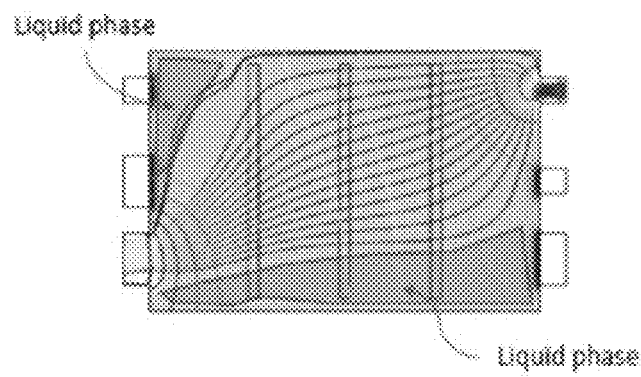
FIGS. 10A and 10B illustrate gas flow and reaction prediction results for a uniformly-spaced channel design using a two-phase model, in accordance with one or more embodiments shown and described herein.
Figure 10B:
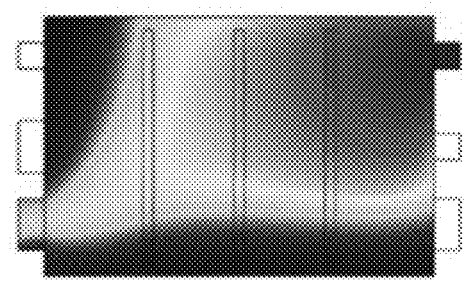

FIGS. 10A and 10B illustrate a phase composition map and an oxygen distribution map for a channel design using the two-phase predication model, in accordance with one or more embodiments. The blue regions indicate low oxygen concentration, and thus, low (electricity current) generation at the reaction region due to liquid flooding. FIG. 10A illustrates gas velocity streamlines and the predicted liquid phase regions of the FC plate. In the illustrated reaction map of FIG. 10B, the two-phase predication model confirms that gas flow inside the predicted liquid region is limited, and less reaction in the predicted liquid flooded region.

Figure 11A:
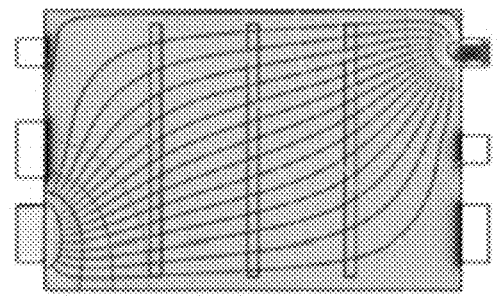
FIGS. 11A and 11B illustrate gas flow and reaction prediction results for a uniformly-spaced channel design that does not use a two-phase model.
Figure 11B:
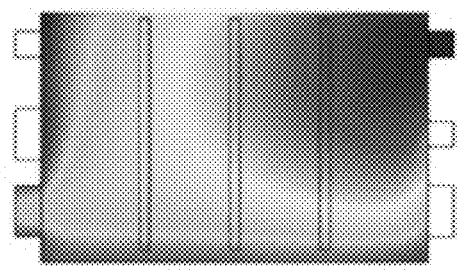

FIGS. 11A and 11B illustrate a phase composition map and an oxygen distribution map for a channel design that does not use the two-phase predication model. Under this predication model, which assumes the existence of a gas phase everywhere in the air layer, and thus, no liquid flooding. This is not realistic, however, particularly since it assumes no water generation at the reaction region.

Methods

FIGS. 12 to 15 illustrate flowcharts of example methods 300, 400, 500, and 600 for designing fluid flow networks for a FC bipolar plate and for predicting liquid regions and vapor regions in an FC bipolar plate, in accordance with embodiments. Each method is to yield an optimized design of a FC bipolar plate having channel configurations that reduce the overall size of the FC. Moreover, each method is to yield an optimized design of a FC bipolar having enhanced operational performance by facilitating more uniform cooling of the MEA at the cooling layer. Such uniform cooling, in turn, facilitates more uniform reactions at the MEA that in turn, maximizes the generation of electricity by the FC stack.

The flowchart of each respective method 300, 400, 500, and 600 corresponds to the schematic illustrations of the method illustrated in FIG. 2 which is set forth and described herein. In accordance with embodiments, each method 300, 400, 500, and 600 may be implemented, for example, using logic instructions (e.g., software), configurable logic, fixed-functionality hardware logic, etc., or any combination thereof. As an example, software executed on one or more computer systems may provide functionality described or illustrated herein. Each computing system respectively includes one or more processors. In particular, software executing on one or more computer systems may perform one or more fabrication or processing blocks of each method 300, 400, 500, and 600 described or illustrated herein or provides functionality described or illustrated herein.

Figure 12:
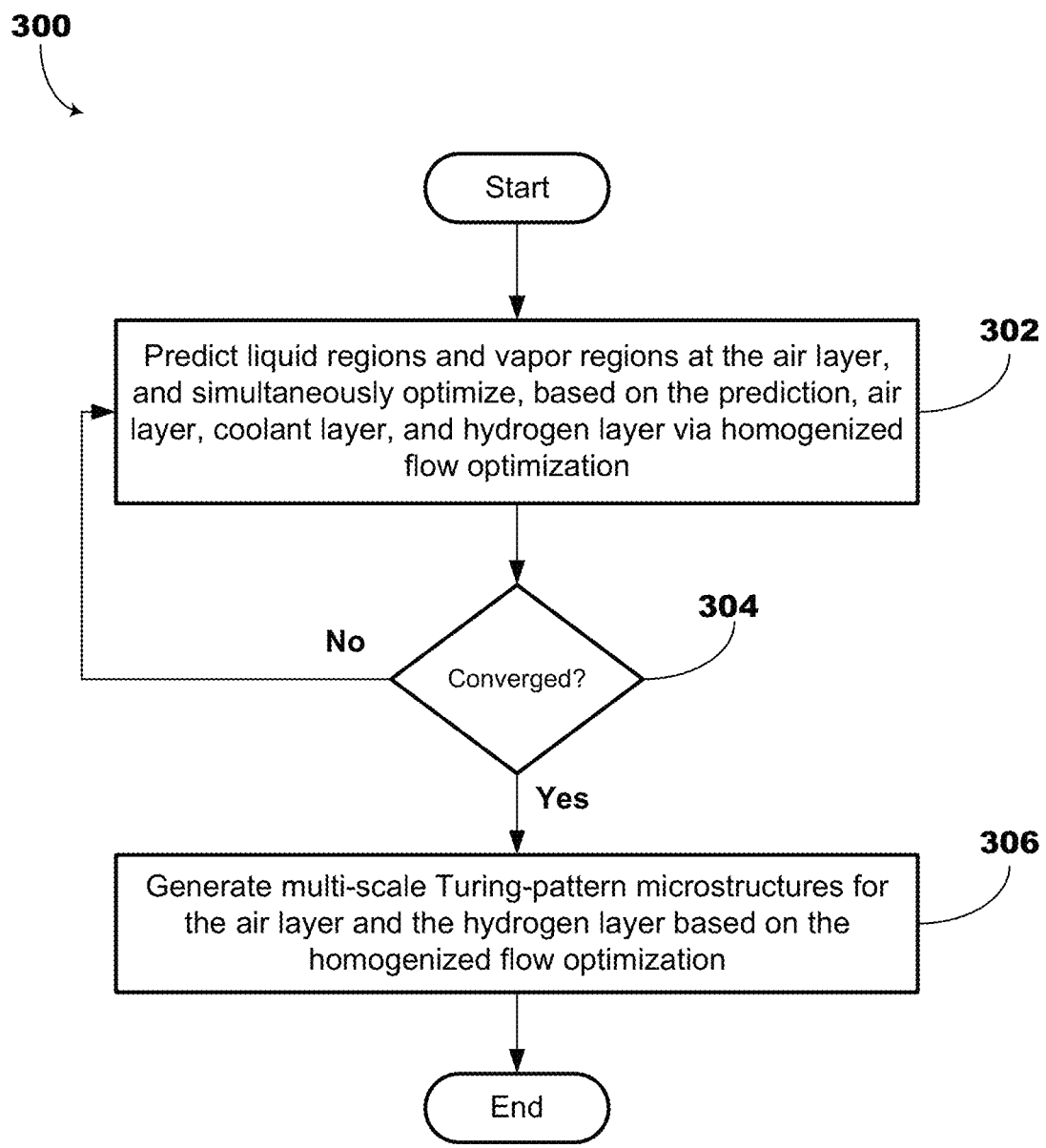
FIG. 12 illustrates a schematic diagram of an example method of designing fluid flow networks in a FC bipolar plate, in accordance with one or more embodiments shown and described herein.

As illustrated in FIG. 12, in the method 300, illustrated processing block 302 includes predicting a location of one or more liquid regions and one or more vapor regions at channels of an air layer of a plate of the fuel cell, and simultaneously optimizing, via homogenized flow optimization, the air layer, the hydrogen layer, and the coolant layer.

In accordance with one or more embodiments, predicting the location of the liquid region(s) and the vapor region(s) comprises executing an optimization method to identify, in the channels of the air layer, one or more regions where oxygen concentration is less than a predetermined threshold concentration, and applying material properties of a liquid phase and a vapor phase to the identified one or more regions.

In accordance with one or more embodiments, predicting the location of the liquid region(s) and the vapor region(s) comprises applying material properties of a liquid phase and a vapor phase to the identified one or more regions.

In accordance with one or more embodiments, simultaneously optimizing may comprise assigning design variables to only the air layer and the hydrogen layer based on a stacked configuration of the air layer and the hydrogen layer. Alternatively or additionally, simultaneously optimizing may comprise describing configuration of the coolant layer as a function of design variables in the air layer and the hydrogen layer. Alternatively or additionally, simultaneously optimizing may comprise assigning objective functions to the air layer, the hydrogen layer, and the coolant layer. Alternatively or additionally, homogenized flow optimization may comprise applying an inverse permeability expression to iteratively design a porous fluid flow structure for the air layer, the hydrogen layer, and the coolant layer.

The method 300 can then proceed to illustrated process block 304, which includes making a determination of whether convergence occurs between the liquid phase and the vapor phase.

If "No," i.e., should the determination conclude there is no convergence between the liquid phase and the vapor phase, the method 300 then returns to the optimization set forth in process block 302.

If "Yes," i.e., should the determination conclude convergence between the liquid phase and the vapor phase, the method 300 can then proceed to process block 306, which includes generating, in response to the optimizing stage, multi-scale Turing-patterned microstructures for the air layer and the hydrogen layer.

Generating the multi-scale Turing-patterned microstructures may comprise propagating, using results from the homogenized flow optimization, anisotropic diffusion coefficient tensors for reaction-diffusion equations through time to generate one or more Turing-patterned microstructures for the air layer and the hydrogen layer. The resultant channels are multi-scale in that a larger flow structure interfaces with smaller flow structures. The method 300 can then terminate or end after completion of process block 306.

Figure 13:
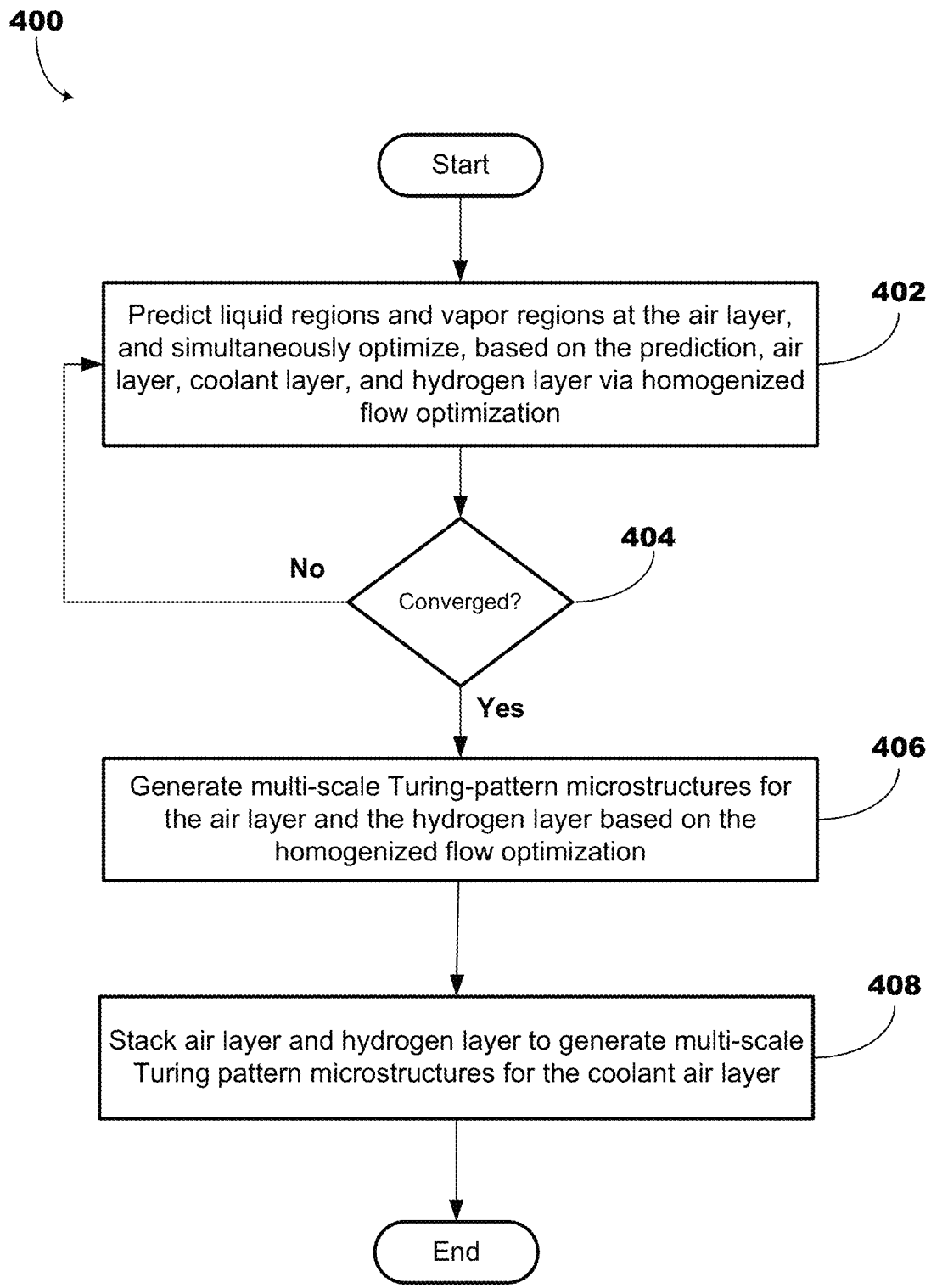
FIG. 13 illustrates a schematic diagram of an example method of designing fluid flow networks in a FC bipolar plate, in accordance with one or more embodiments shown and described herein.

As illustrated in FIG. 13, in the method 400, illustrated processing block 402 includes predicting a location of one or more liquid regions and one or more vapor regions at channels of an air layer of a plate of the fuel cell, and then simultaneously optimizing, via homogenized flow optimization, the air layer, the hydrogen layer, and the coolant layer.

In accordance with one or more embodiments, predicting the location of the liquid region(s) and the vapor region(s) comprises executing an optimization method to identify, in the channels of the air layer, one or more regions where oxygen concentration is less than a predetermined threshold concentration, and applying material properties of a liquid phase and a vapor phase to the identified one or more regions.

In accordance with one or more embodiments, predicting the location of the liquid region(s) and the vapor region(s) comprises applying material properties of a liquid phase and a vapor phase to the identified one or more regions.

In accordance with one or more embodiments, simultaneously optimizing may comprise assigning design variables to only the air layer and the hydrogen layer based on a stacked configuration of the air layer and the hydrogen layer. Alternatively or additionally, simultaneously optimizing may comprise describing configuration of the coolant layer as a function of design variables in the air layer and the hydrogen layer. Alternatively or additionally, simultaneously optimizing may comprise assigning objective functions to the air layer, the hydrogen layer, and the coolant layer. Alternatively or additionally, homogenized flow optimization may comprise applying an inverse permeability expression to iteratively design a porous fluid flow structure for the air layer, the hydrogen layer, and the coolant layer.

The method 400 can then proceed to illustrated process block 404, which includes making a determination of whether convergence occurs between the liquid phase and the vapor phase.

If "No," i.e., should the determination conclude there is no convergence between the liquid phase and the vapor phase, the method 400 then returns to the optimization set forth in process block 402.

If "Yes," i.e., should the determination conclude convergence between the liquid phase and the vapor phase, the method 400 can then proceed to process block 406, which includes generating, in response to the optimizing, multi-scale Turing-patterned microstructures for the air layer and the hydrogen layer.

Generating the multi-scale Turing-patterned microstructures may comprise propagating, using results from the homogenized flow optimization, anisotropic diffusion coefficient tensors for reaction-diffusion equations through time to generate one or more Turing-patterned microstructures for the air layer and the hydrogen layer. The resultant channels are multi-scale in that a larger flow structure interfaces with smaller flow structures.

The method 400 may then proceed to illustrated process block 408, which includes stacking the air layer and the hydrogen layer to generate one or more multi-scale Turing-patterned microstructures for the coolant layer. The method 400 can then terminate or end after completion of process block 408.

Figure 14:
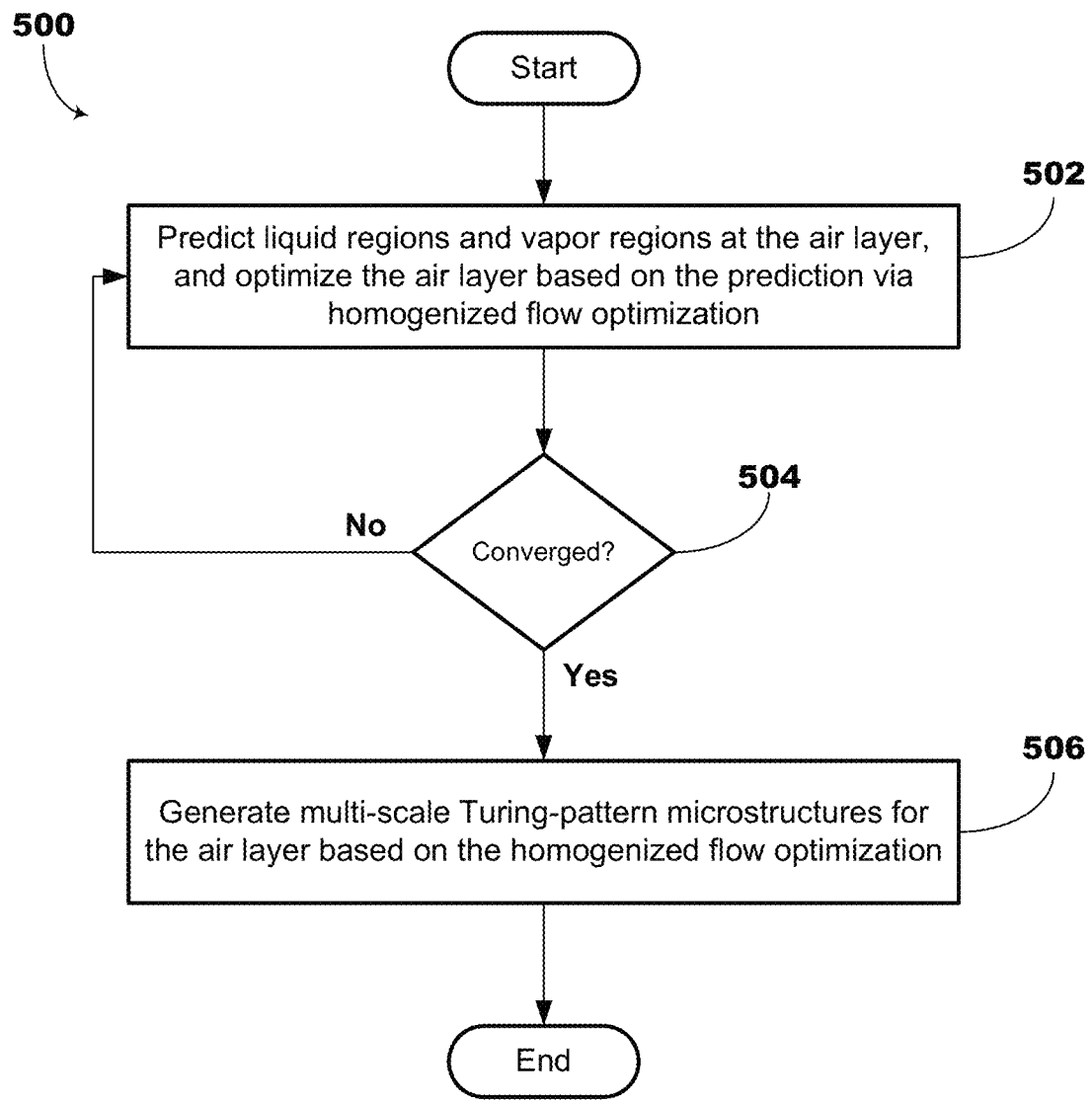
FIG. 14 illustrates a schematic diagram of an example method of designing fluid flow networks in a FC bipolar plate, in accordance with one or more embodiments shown and described herein.

As illustrated in FIG. 14, in the method 500, illustrated processing block 502 includes predicting a location of one or more liquid regions and one or more vapor regions at channels of an air layer of a plate of the fuel cell, and then optimizing the air layer via homogenized flow optimization.

In accordance with one or more embodiments, predicting the location of the liquid region(s) and the vapor region(s) comprises executing an optimization method to identify, in the channels of the air layer, one or more regions where oxygen concentration is less than a predetermined threshold concentration, and applying material properties of a liquid phase and a vapor phase to the identified one or more regions.

In accordance with one or more embodiments, predicting the location of the liquid region(s) and the vapor region(s) comprises applying material properties of a liquid phase and a vapor phase to the identified one or more regions.

In accordance with one or more embodiments, predicting the location of the liquid region(s) and the vapor region(s) comprises reiteratively executing the optimization method until a convergence occurs between the liquid phase and the vapor phase.

The method 500 can then proceed to illustrated process block 504, which includes making a determination of whether convergence occurs between the liquid phase and the vapor phase.

If "No," i.e., should the determination conclude there is no convergence between the liquid phase and the vapor phase, the method 500 then returns to the optimization set forth in process block 502.

If "Yes," i.e., should the determination conclude convergence between the liquid phase and the vapor phase, the method 500 can then proceed to process block 506, which includes generating, in response to the optimizing, multi-scale Turing-patterned microstructures for the air layer.

Generating the multi-scale Turing-patterned microstructures may comprise propagating, using results from the homogenized flow optimization, anisotropic diffusion coefficient tensors for reaction-diffusion equations through time to generate one or more Turing-patterned microstructures for the air layer. The resultant microchannels are multi-scale in that a larger flow structure interfaces with smaller flow structures. The method 500 can then terminate or end after completion of process block 506.

Figure 15:
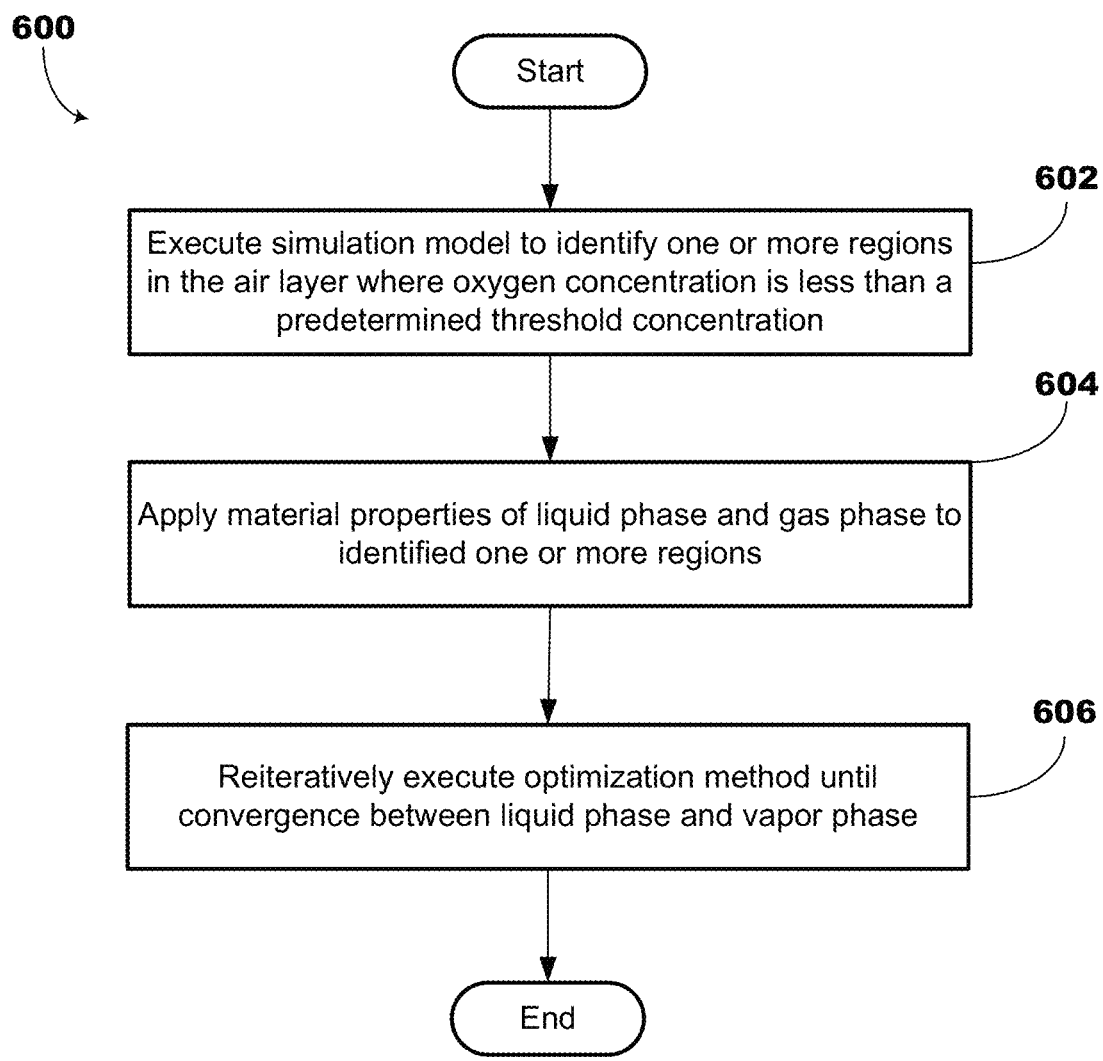
FIG. 15 illustrates a schematic diagram of an example method of predicting liquid regions and vapor regions in fluid flow networks of a FC bipolar plate, in accordance with one or more embodiments shown and described herein.

As illustrated in FIG. 15, in the method 600, illustrated processing block 602 includes executing a simulation model to identify, in the microchannels of the air layer, one or more regions where oxygen concentration is less than a predetermined threshold concentration.

The method 600 may then proceed to illustrated process block 604, which includes applying material properties of a liquid phase and a vapor phase to the identified one or more regions.

The method 600 may then proceed to illustrated process block 606, which includes reiteratively executing the optimization method until a convergence occurs between the liquid phase and the vapor phase of the air layer. The method 600 can then terminate or end after completion of process block 606.

The terms "coupled," "attached," or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:

1. A method of designing a fuel cell, the method comprising:
   by one or more computing devices having one or more processors:
     predicting a location of one or more liquid regions and one or more vapor regions in microchannels at an air layer of a plate of the fuel cell, wherein the prediction comprises executing an optimization method to identify, in the microchannels of the air layer, one or more regions where oxygen concentration is less than a predetermined threshold concentration;
     wherein predicting further comprises applying, iteratively, material properties of a liquid phase and a vapor phase to the identified one or more regions until convergence is achieved;
     passing the material properties of the liquid phase and the vapor phase to the optimization method after the convergence is achieved between the liquid phase and the vapor phase;
     optimizing, based on the prediction, the material properties of the liquid phase and the vapor phase, and via a homogenized flow optimization, fluid flow networks for the air layer, a hydrogen layer, and a coolant layer of the fuel cell;
     generating, based on the homogenized flow optimization, one or more multi-scale Turing-patterned microstructures for the air layer and the hydrogen layer, the generating the one or more multi-scale Turing-patterned microstructures comprising propagating anisotropic diffusion coefficient tensors for reaction-diffusion equations through time, wherein the one or more multi-scale Turing-patterned microstructures include multi-scale channels such that a larger flow structure interfaces with a smaller flow structure; and
     creating a fuel cell to convert chemical potential energy into electrical energy by, at least in part, stacking the air layer and the hydrogen layer in parallel to respectively define half channels for the coolant layer.

2. The method of claim 1, wherein the prediction comprises reiteratively executing the optimization method until the convergence occurs between the liquid phase and the vapor phase.

3. The method of claim 1, wherein optimizing comprises:
   assigning design variables to only the air layer and the hydrogen layer based on a stacked configuration of the air layer and the hydrogen layer, and
   describing configuration of the coolant layer as a function of design variables in the air layer and the hydrogen layer.

4. The method of claim 1, wherein the homogenized flow optimization process comprises applying an inverse permeability expression to iteratively design a porous fluid flow structure for the air layer, the hydrogen layer, and the coolant layer.

5. The method of claim 1, wherein the multi-scale Turing-patterned microstructures comprise one or more larger flow structures that are fluidically connected to a plurality of smaller flow structures.

6. A method of designing a fuel cell, the method comprising:
   by one or more computing devices having one or more processors:
     predicting a location of one or more liquid regions and one or more vapor regions in microchannels at an air layer of a plate of the fuel cell, wherein the prediction comprises executing an optimization method to identify, in the microchannels of the air layer, one or more regions where oxygen concentration is less than a predetermined threshold concentration;
     wherein predicting further comprises applying, iteratively, material properties of a liquid phase and a vapor phase to the identified one or more regions until convergence is achieved;
     passing the material properties of the liquid phase and the vapor phase to the optimization method after the convergence is achieved between the liquid phase and the vapor phase;
     optimizing, based on the prediction, the material properties of the liquid phase and the vapor phase, and via a homogenized flow optimization, fluid flow networks for the air layer, a hydrogen layer, and a coolant layer of the fuel cell;
     generating, based on the homogenized flow optimization, one or more multi-scale Turing-patterned microstructures for the air layer and the hydrogen layer, the generating the one or more multi-scale Turing-patterned microstructures comprising propagating anisotropic diffusion coefficient tensors for reaction-diffusion equations through time; and
     creating a fuel cell to convert chemical potential energy into electrical energy by, at least in part, stacking the air layer and the hydrogen layer in parallel to each define half channels for the coolant layer.

7. The method of claim 6, wherein the prediction comprises reiteratively executing the optimization method until the convergence occurs between the liquid phase and the vapor phase.

8. The method of claim 6, wherein optimizing comprises:
   assigning design variables to only the air layer and the hydrogen layer based on a stacked configuration of the air layer and the hydrogen layer, and
   describing configuration of the coolant layer as a function of design variables in the air layer and the hydrogen layer.

9. The method of claim 6, wherein the homogenized flow optimization process comprises applying an inverse permeability expression to iteratively design a porous fluid flow structure for the air layer, the hydrogen layer, and the coolant layer.

10. The method of claim 6, wherein the multi-scale Turing-patterned microstructures comprise one or more larger flow structures that are fluidically connected to a plurality of smaller flow structures.

11. A method of designing a fuel cell, the method comprising:
- by one or more computing devices having one or more processors:
  - predicting a location of one or more liquid regions and one or more vapor regions in microchannels of an air layer of a plate of the fuel cell, and optimizing, via homogenized flow optimization, fluid flow networks for the air layer based on the prediction, wherein the prediction comprises executing an optimization method to identify, in the microchannels of the air layer, one or more regions where oxygen concentration is less than a predetermined threshold concentration;
  - wherein predicting further comprises applying, iteratively, material properties of a liquid phase and a vapor phase to the identified one or more regions until convergence is achieved;
  - passing the material properties of the liquid phase and the vapor phase to the optimization method after the convergence is achieved between the liquid phase and the vapor phase;
  - optimizing, based on the prediction, the material properties of the liquid phase and the vapor phase, and via a homogenized flow optimization, fluid flow networks for the air layer, a hydrogen layer, and a coolant layer of the fuel cell;
  - generating, in response to the optimizing, one or more multi-scale Turing-patterned microstructures for the air layer, the generating the one or more multi-scale Turing-patterned microstructures comprising propagating anisotropic diffusion coefficient tensors for reaction-diffusion equations through time, wherein the one or more multi-scale Turing-patterned microstructures include multi-scale channels such that a larger flow structure interfaces with a smaller flow structure; and
  - creating a fuel cell to convert chemical potential energy into electrical energy by, at least in part, stacking the air layer and a hydrogen layer in parallel to define a coolant layer.

12. The method of claim 11, wherein the prediction comprises reiteratively executing the optimization method until the convergence occurs between the liquid phase and the vapor phase.

13. The method of claim 11, wherein the multi-scale Turing-patterned microstructures comprise one or more larger flow structures that are fluidically connected to a plurality of smaller flow structures.

* * * * *